United States Patent
Humfeld et al.

(10) Patent No.: US 8,715,609 B2
(45) Date of Patent: May 6, 2014

(54) AUGMENTED REACTOR FOR CHEMICAL VAPOR DEPOSITION OF ULTRA-LONG CARBON NANOTUBES

(75) Inventors: Keith Daniel Humfeld, Garden Grove, CA (US); Venkatacha Parameswaran, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 12/967,651

(22) Filed: Dec. 14, 2010

(65) Prior Publication Data

US 2012/0148475 A1   Jun. 14, 2012

(51) Int. Cl.
*D01F 9/12* (2006.01)
*C23C 16/26* (2006.01)

(52) U.S. Cl.
USPC ......... 423/447.3; 422/129; 977/742; 977/843

(58) Field of Classification Search
USPC .................. 423/447.3, 447.1, 447.2, 445 B; 977/734–741, 842–848
See application file for complete search history.

(56) References Cited

U.S. PATENT DOCUMENTS

| | | | |
|---|---|---|---|
| 4,571,227 A * | 2/1986 | Colanzi et al. | 474/199 |
| 7,323,157 B2 * | 1/2008 | Kinloch et al. | 423/447.3 |
| 7,611,579 B2 * | 11/2009 | Lashmore et al. | 117/84 |
| 7,625,544 B2 | 12/2009 | Liu et al. | |
| 7,714,798 B2 * | 5/2010 | Lashmore et al. | 343/897 |
| 7,744,793 B2 * | 6/2010 | Lemaire et al. | 264/172.19 |
| 7,850,778 B2 * | 12/2010 | Lemaire | 118/715 |
| 8,162,643 B2 * | 4/2012 | Lemaire et al. | 425/66 |
| 2005/0006801 A1 * | 1/2005 | Kinloch et al. | 264/5 |
| 2005/0170089 A1 * | 8/2005 | Lashmore et al. | 427/248.1 |
| 2007/0036709 A1 * | 2/2007 | Lashmore et al. | 423/447.1 |
| 2007/0237959 A1 * | 10/2007 | Lemaire | 428/408 |
| 2007/0257859 A1 * | 11/2007 | Lashmore et al. | 343/897 |
| 2008/0014431 A1 * | 1/2008 | Lashmore et al. | 428/315.5 |
| 2008/0018012 A1 * | 1/2008 | Lemaire et al. | 264/82 |
| 2008/0170982 A1 * | 7/2008 | Zhang et al. | 423/447.3 |
| 2009/0032741 A1 | 2/2009 | Lashmore | |
| 2010/0244307 A1 * | 9/2010 | Lemaire et al. | 264/171.26 |
| 2011/0117316 A1 * | 5/2011 | Lemaire | 428/113 |
| 2012/0205834 A1 * | 8/2012 | Lemaire et al. | 264/171.26 |

FOREIGN PATENT DOCUMENTS

| | | |
|---|---|---|
| WO | 2005007926 A2 | 1/2005 |
| WO | 2008036068 A2 | 3/2008 |

OTHER PUBLICATIONS

Ex Parte Quayle Action dated Nov. 1, 2013, pp. 2-6.*
Wang, X. et al; Fabrication of Ultralong and Electrically Uniform Single-Walled Carbon Nanotubes on Clean Substrates; Nano Letters; American Chemical Society; Dept. of Physics and Tsinghua-Foxconn Nanotechnology Research Center, Tsinghua University, Beijing, China; Apr. 20, 2009; pp. A-E.

(Continued)

*Primary Examiner* — Daniel C McCracken
(74) *Attorney, Agent, or Firm* — Armstrong Teasdale LLP

(57) ABSTRACT

Apparatus to produce carbon nanotubes (CNTs) of arbitrary length using a chemical vapor deposition (CVD) process reactor furnace is described, where the CNTs are grown axially along a portion of the length of the furnace. The apparatus includes a spindle and a mechanism for rotating the spindle. The spindle located within a constant temperature region of the furnace and operable to collect the CNT around the rotating spindle as the CNT is grown within the furnace.

8 Claims, 7 Drawing Sheets

(56) References Cited

OTHER PUBLICATIONS

Extended European Search Report for App. No. 11192945.1 dated Apr. 13, 2012, 8 pages.
Tran et al., "Improving the Tensile Strength of Carbon Nanotube Spun Yarns Using a Modified Spinning Process", Carbon, Sep. 2009, pp. 2662-2670, vol. 47, No. 11, Elsevier Ltd., Australia.
Ya-Li et al., "Direct Spinning of Carbon Nanotube Fibers from Chemical Vapor Deposition Synthesis", Science, Jan. 1, 2004, pp. 276-278, vol. 304, American Association for the Advancement of Science, Washington, DC.
Jiang et al., "Spinning Continuous Carbon Nanotube Yarns", Nature, Oct. 24, 2002, p. 801, vol. 419, Nature Publishing Group, United Kingdom.

* cited by examiner

AUGMENTED REACTOR FOR CHEMICAL VAPOR DEPOSITION OF ULTRA-LONG CARBON NANOTUBES

BACKGROUND

The field of the disclosure relates generally to the growing of nanotubes, and more specifically, to an augmented reactor for chemical vapor deposition (CVD) of ultra-long carbon nanotubes (CNTs).

Carbon nanotubes are small tube-shaped structures essentially having a composition of a graphite sheet in a tubular form. Carbon nanotubes feature diameters less than 100 nanometers, and large aspect ratios, where the length is much greater than is the diameter. For example, a length of the CNT may be more than 1000 times the diameter. CNTs are semiconducting or highly conducting, depending on their chirality. Such features make carbon nanotubes ideal for a multitude of electronic applications.

Generally, carbon nanotubes can be classified into single-wall type and multi-wall type. A single-wall type carbon nanotube structure has only one cylindrical graphitic layer. A multi-wall type carbon nanotube structure has two or more nested cylindrical graphitic layers.

Existing linear chemical vapor deposition (CVD) reactors are capable of growing carbon nanotubes either perpendicular to the feed gas flow or aligned along the direction of the feed gas flow. Perpendicular growths are limited in height to the size of the tube defined by the furnace in which the CNTs are grown, usually one, two, or four inches. Growth aligned with the feed gas flow direction is limited in length to the size of the region within the furnace over which the temperature remains constant.

Tube furnaces currently used for linear CVD reactors are approximately four feet in length. The ends of the reactor tube protrude from the furnace such the temperature is not constant near the ends of the furnace. The center of the furnace contains a region of constant temperature. In CVD CNT growth, the feed gas is heated to a certain temperature, which takes some time, and since the feed gas is flowing, takes some distance. This distance is longer than the cooler region at the beginning of the CVD reactor tube. Only the region beginning from where the gas is sufficiently heated to an ending point of this constant temperature region in the tube furnace can be used for nanotube growth.

The longest nanotubes grown to date in such tube furnaces are approximately 18.5 cm in length. The growth terminated at this length because the chamber temperature decreased approximately 18.5 cm past the growth substrate.

One solution for the production of longer nanotubes would be to use a longer straight (linear) CVD reactor in a longer furnace. However, the length of tube produced is still limited by the length of furnace and the CVD reactor tubes available, and thus nanotubes of arbitrary length cannot be fabricated.

BRIEF DESCRIPTION

In one aspect, apparatus to produce carbon nanotubes (CNTs) of arbitrary length using a chemical vapor deposition (CVD) process reactor furnace is provided, the CNTs grown axially along a portion of the length of the furnace. The apparatus includes a spindle and a mechanism for rotating the spindle. The spindle is located within a constant temperature region of the furnace and operable to collect the CNT around the rotating spindle as the CNT is grown within the furnace.

In another aspect, a method to grow carbon nanotubes (CNTs) of arbitrary length within a standard chemical vapor deposition (CVD) furnace is provided. The method includes rotating a spindle within the CNT growth region of the furnace, directing the CNTS as they are grown in the direction of the rotating spindle such that the growing CNTs will attach and rotationally collect on the spindle, and maintaining a temperature in the region of the spindle at a temperature proximate a CNT growth temperature.

In still another aspect, a chemical vapor deposition (CVD) process furnace is provided. The furnace includes a reaction chamber configured for the growth of carbon nanotubes from a catalyst therein and a gas flow therethrough, and a rotatable spindle disposed within the reaction chamber. The rotatable spindle is downstream from the catalyst with respect to the gas flow, and the rotatable spindle is operable for collecting the CNTs around the rotatable spindle as the CNTs are blown in the direction of the rotatable spindle due to the gas flow.

The features, functions, and advantages that have been discussed can be achieved independently in various embodiments or may be combined in yet other embodiments further details of which can be seen with reference to the following description and drawings.

DETAILED DESCRIPTION

Referring to the above paragraphs, as a constant temperature region is needed to continue nanotube growth, production of arbitrarily long carbon nanotubes within current furnaces necessitates a non-linear growth path for the nanotube within the CVD reactor. To meet this need, the described embodiments relate to a traditional tube furnace used to grow carbon nanotubes via chemical vapor deposition which is augmented with a removable, rotating spindle. The addition of the rotating spindle allows nanotubes of an arbitrary length to be grown by overcoming the thermal and geometric limitations inherent to the traditional tube furnace.

Specifically, as the nanotubes are grown they encounter a rotating spindle within the furnace. The nanotubes are wound onto the spindle as they grow, which allows tubes of any length to be grown within the relatively small region where a constant temperature can be maintained.

Figure 1:
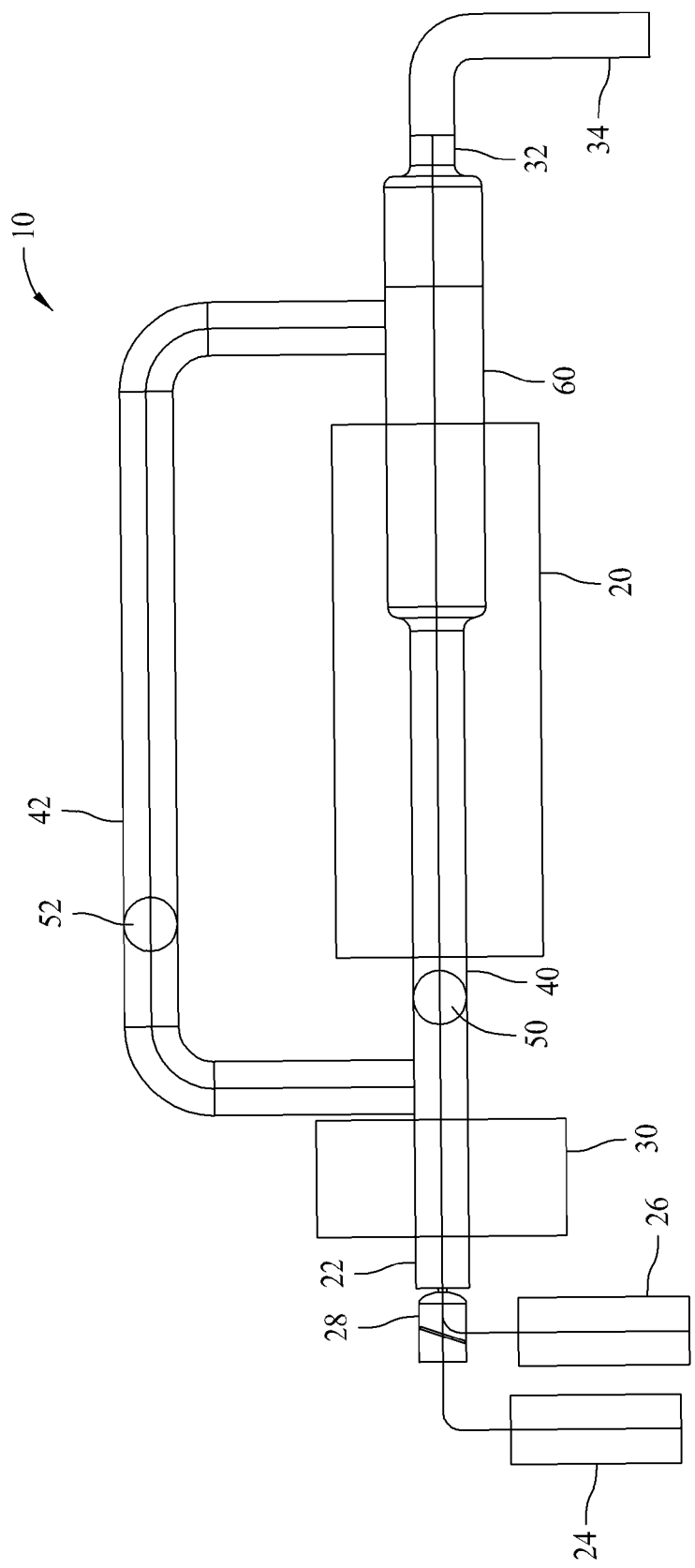
FIG. 1 is a schematic, side view of a linear chemical vapor deposition reactor.

FIG. 1 is a schematic, side view of a linear chemical vapor deposition reactor 10 useful for manufacturing carbon nanotubes. Reactor 10 includes a reaction furnace 20, and a gas introducing tube 22 through which an inert gas 24 and a feed gas 26 are introduced via a flow control nozzle 28 into a heat exchanger 30. As shown, reaction furnace 20 is a substantially tubular container and as further described, incorporates high-temperature resistant material having steady chemical properties (e.g., quartz, alumina, or another high-temperature resistant ceramic). Reactor 10 includes an end cap 32, through which exhaust gases pass. An exhaust tube 34 exits the end cap 32. The portion of reactor 10 between heat exchanger 30 and end cap 32 includes the furnace 20 and is sometimes referred to as a main duct 40. A bypass duct 42 extends from the main duct 40 from proximate the heat exchanger 30 to proximate the end cap 32, bypassing the furnace 20. Both the main duct 40 and the bypass duct 42 include shut off valves 50 and 52 respectively. An output of the heat exchanger 30 is directed through the furnace 20 or the bypass duct 42 such that the portion of the furnace 20 where nanotubes are grown can be brought up to and maintained at a temperature at which nanotubes are grown. A portion 60 of the main duct 40 is shown as being enlarged in diameter. Such depiction is representative of one embodiment of reactor 10. Embodiments where the entire length of main duct 40 is of a single diameter are also known.

Figure 2:
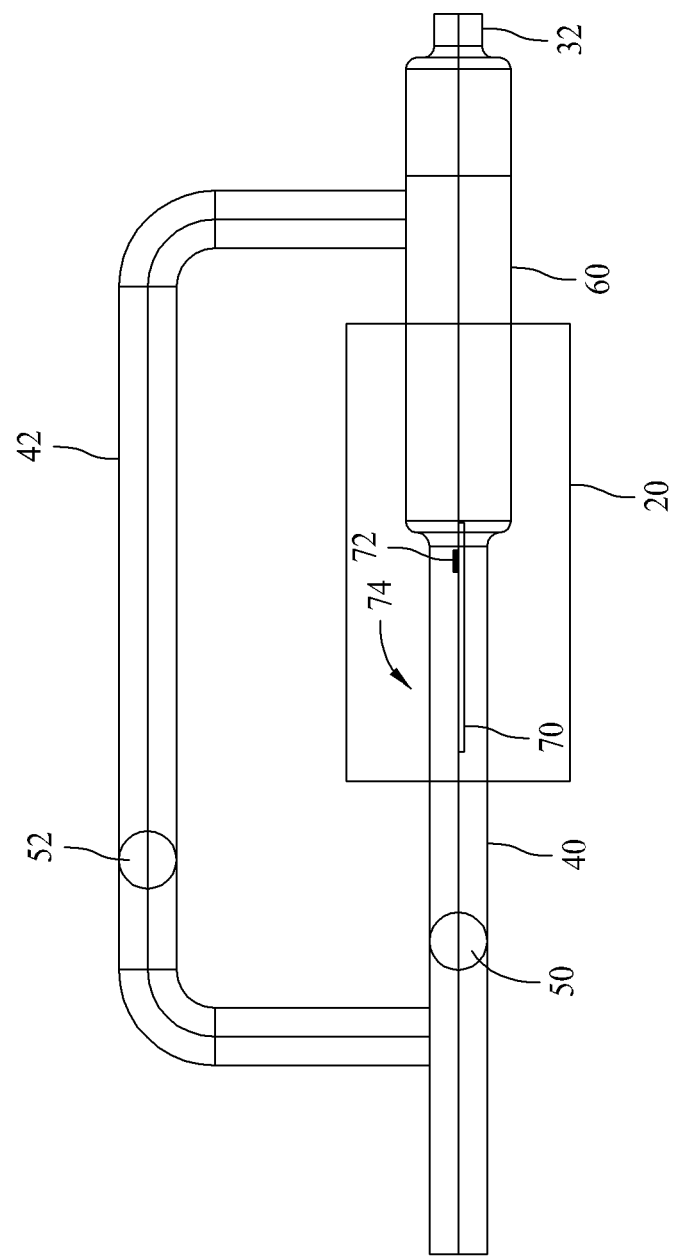
FIG. 2 is a cutaway view of a portion of the CVD reactor of FIG. 1.

FIG. 2 is a cutaway view of a portion of the reactor 10 of FIG. 1. A modified substrate 70 having a catalyst 72 disposed thereon is shown as being within a reaction chamber 74 that is defined as a portion of the reaction furnace 20 that can be maintained at a constant temperature for the growth of nanotubes. The gas flow through main duct 40 is directed towards the catalyst 72 and transports a feed gas 26 which causes carbon nanotubes to be grown from the catalyst 72. Carbon nanotubes are grown, for example, perpendicularly from the catalyst 72 due to the presence of a carbon source gas within the gas flow in the reaction chamber 74. As described above, only a portion of the reaction chamber 74 can reasonably be maintained at the constant temperature needed for the growth of the nanotubes.

Reactor 10 with furnace 20 is capable of growing nanotubes either perpendicular to the feed gas flow or aligned along the feed gas flow direction. Length of the nanotubes grown perpendicularly is limited by the diameter of furnace 20. Carbon nanotubes that are grown and aligned with the feed gas flow direction are limited in length to the size of the reaction chamber 74 over which the temperature remains constant. The flow control nozzle 28 and end cap 32 protrude from the opposite ends of furnace 20 and therefore temperatures are not constant near the ends of the furnace 20. The reaction chamber 74 portion of the furnace 20 is where the modified substrate 70 with the catalyst 72 is located, and is within the region of constant temperature.

Summarizing, to grow carbon nanotubes using chemical vapor deposition, the feed gas 24 is heated to a certain temperature, which takes some time and since the feed gas 24 is flowing, takes some distance. Only the region from where the feed gas 24 is sufficiently heated, to the end of the constant temperature region in the tube furnace 20 can be used for nanotube growth.

Figure 3:
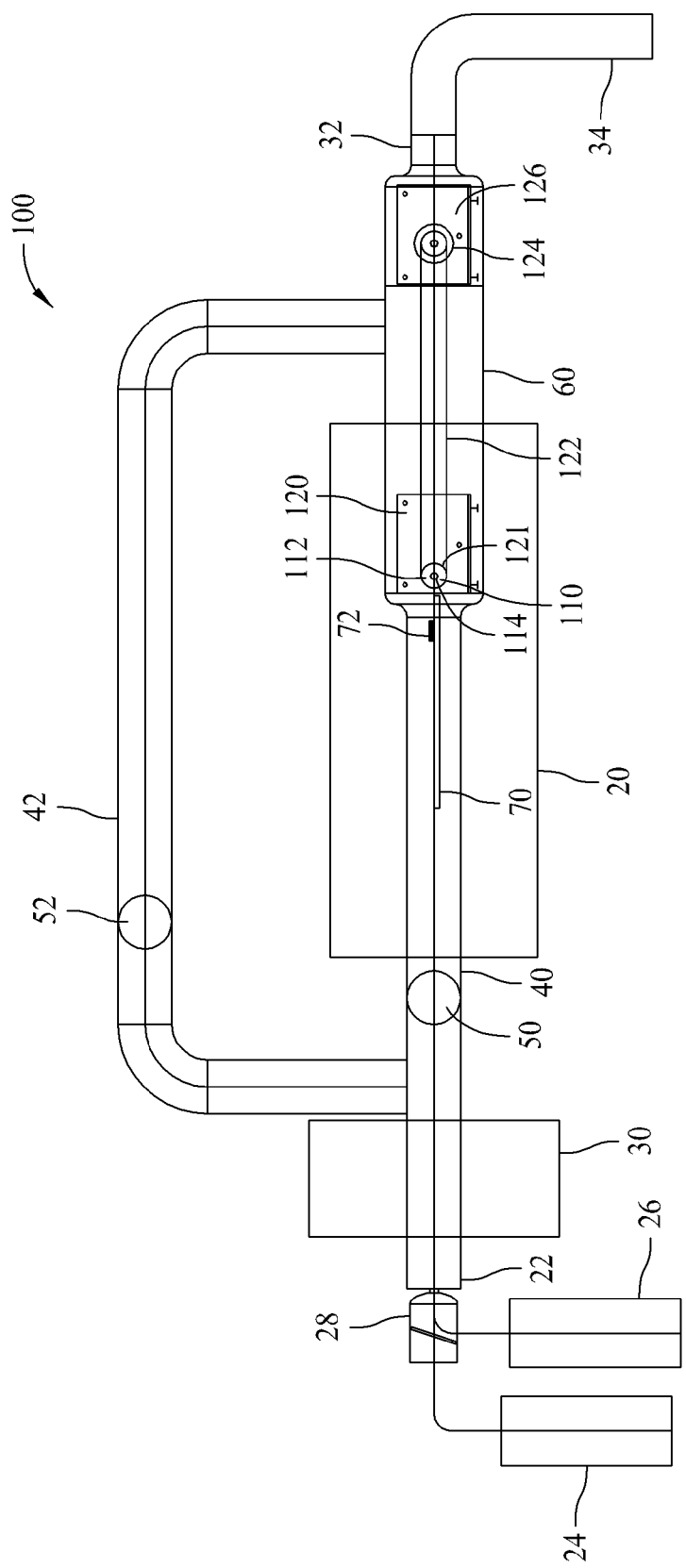
FIG. 3 is cutaway view of one embodiment of an augmented reactor.

Referring now to FIG. 3, cutaway view of an augmented reactor 100 is shown. Components within reactor 100 that are the same as in reactor 10 are shown with the same reference numerals. The gas passes through heat exchanger 30 to be heated to the reaction temperature, before arriving at the furnace 20. The entire assembly is thermally insulated. In this embodiment, the gas travels down bypass duct 42 until the heat exchanger 30 raises the gas to the correct temperature. When the temperature of the gas is raised to the correct temperature, shut-off valves 50 and 52 are switched and the gas flows down the main duct 40. Though a diameter of main duct 40 is shown as widening downstream of the nanotube growth surface, such widening is not required and the embodiments described herein are operable in a furnace of constant diameter.

Reactor 100 includes a spindle 110 within a constant temperature portion of the tube furnace 20. Spindle 110 is placed such that the top 112 of the spindle 110 will be encountered by the nanotubes after they are directed in the axial direction by the force of the gas flow through furnace 20 and grow a horizontal distance. In one embodiment, a surface 114 of spindle 110 is constructed from or coated with a material to which carbon nanotubes tend to adhere. As further described herein, spindle 110 is rotated at a rotational rate such that the linear rate of the top 112 of the spindle 110 substantially matches the carbon nanotube growth rate from catalyst 72. Thus, the nanotubes will grow to the point of touching the spindle 110, adhere to it, and be wound around spindle 110 as spindle 110 rotates. Use of the spindle 110 allows for collection of the CNTs without the CNTs being drawn or bunching up. Since spindle 110 is contained within the reaction chamber 74 (sometimes referred to as a growth region) of the furnace 20, and maintained at the CNT growth temperature, any length of nanotube can be kept in the constant temperature region of the furnace due to the collection on the spindle 110. As further described below, spindle 110 is mounted within furnace 20 to a bracket 120. A pulley 121 is driven by a belt 122 that extends out of furnace 20 and is driven by a motor 124 that is also mounted to a bracket 126 thereby causing rotation of spindle 110.

Figure 4:
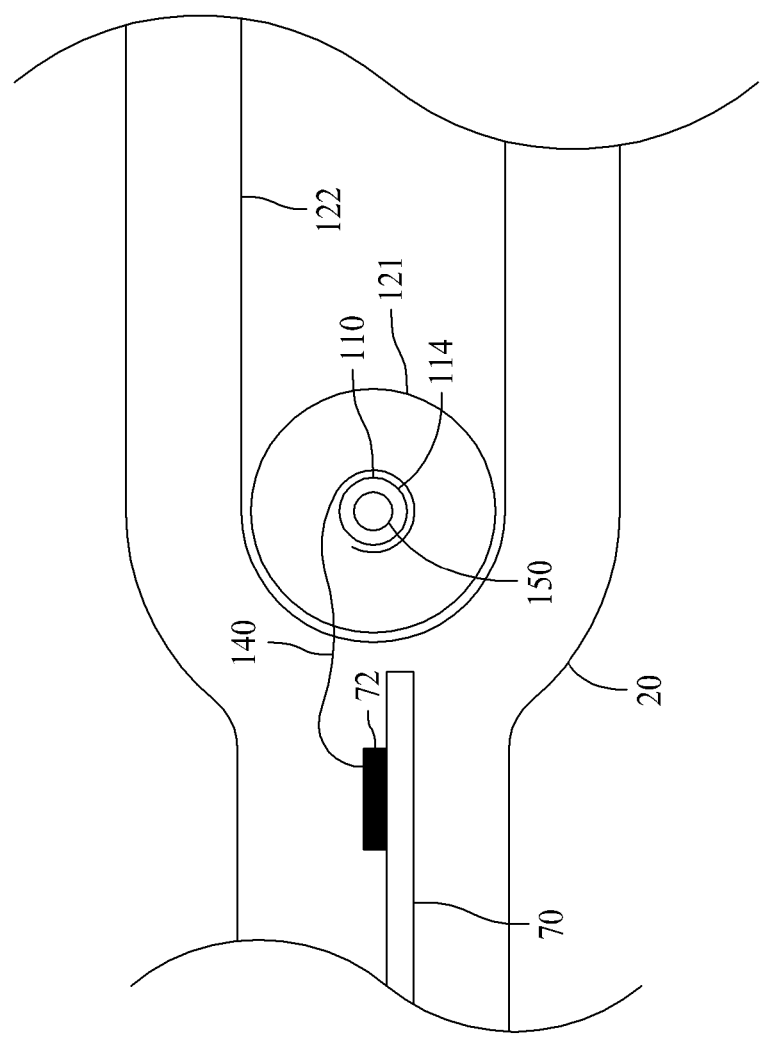
FIG. 4 is a side view of a spindle and catalyst within the constant temperature portion of the furnace of the augmented reactor of FIG. 3.

FIG. 4 is a side view of the spindle 110 and the catalyst 72 within the growth region of furnace 20 of reactor 100. As such, spindle 110 and catalyst can be maintained at the CNT growth temperature. In exaggerated view, a carbon nanotube 140 is growing from catalyst 72 due the flow of gas through furnace 20. Spindle 110 is rotated due to its mechanical connection to pulley 121, as described above, which is driven by belt 122.

Figure 5:
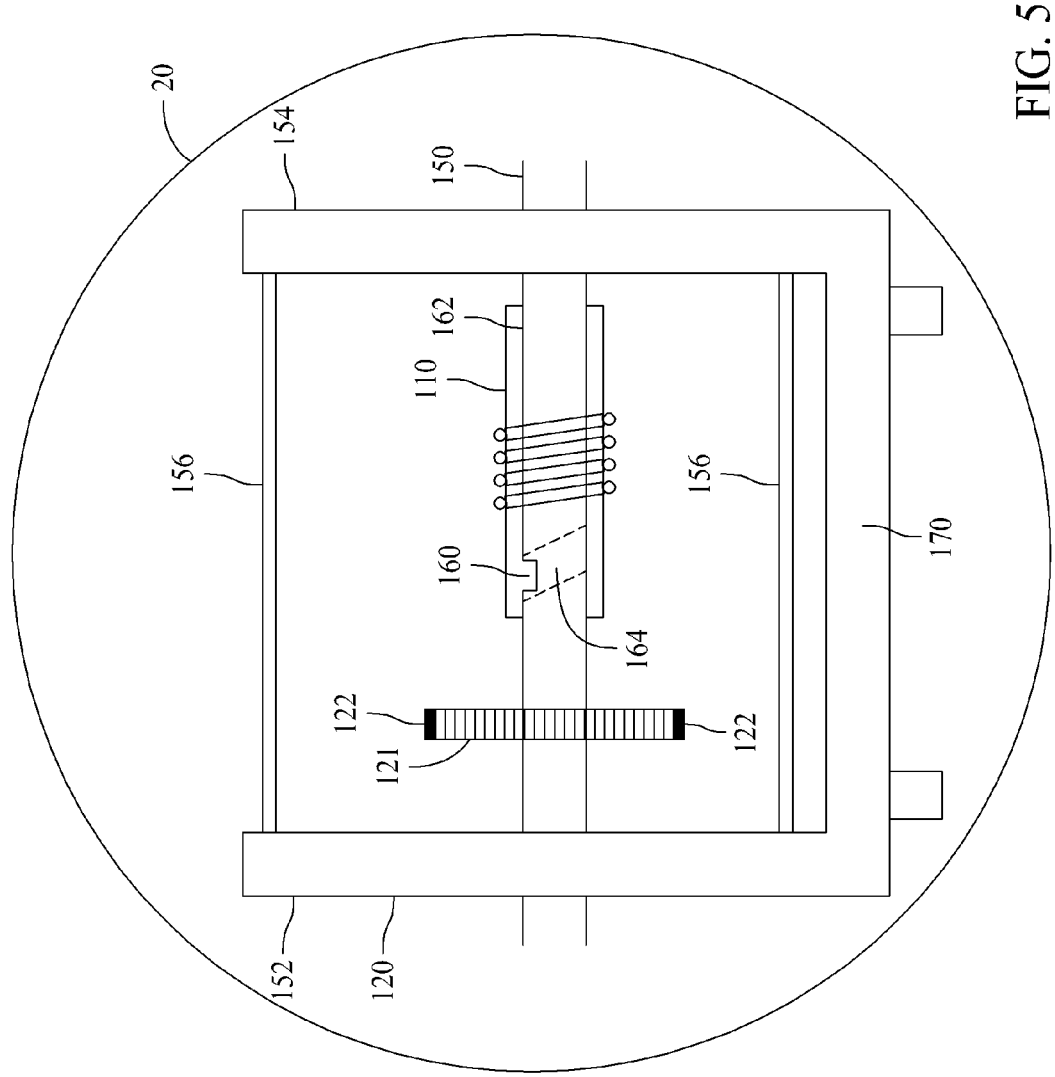
FIG. 5 is an end view of the spindle of FIG. 4 and assembly components related to the spindle.

In one implementation, and as shown in the cross-sectional view of FIG. 5, spindle 110 and related assembly are small enough to fit within the tube furnace 20. The spindle 110 rotates on an axle 150 between two plates 152, 154 of bracket 120. One side of the spindle axle 150 includes pulley 121 which may be geared and rotated by a chain or belt 122. One or more rods 156 at the tops and/or bottoms of the plates 152, 154 to keep the two plates 152, 154 separated from each other. Each plate 152, 154 is connected to a base unit 170.

In another embodiment, a geared base axle may be utilized. The geared base axle moves the chain, which rotates the spindle 110. The geared base axle extends past one of the plates and exits the tube of furnace 20 through a hole. The most convenient implementation may be to have a removable section at the end of the tube, such as an end cap, that contains the base unit and the axle exit hole. Past the axle exit hole, the geared base axle is rotated by a stepper motor. In another embodiment, a belt or chain is not utilized and axle 150 extends out of the furnace 20 and is directly attached to a stepper motor.

In another embodiment, as nanotubes 140 grow and the spindle 110 is rotated, a protrusion 160 device is provided extending from an interior diameter 162 of the spindle 110 such that the spindle 110 may translate back and forth along an axial axis of axle 150 such that the nanotubes 140 are collected onto the spindle 110 in a spiral configuration. Protrusion 160 rides within a mating slot 164 formed within the axle 150. Such a spindle translation allows for additional nanotube length to be collected per spindle, in the case that the spindle is wider than the nanotube growth substrate. In any of the embodiments, after the desired length of nanotube 140 has been grown, the spindle 110 is removed from the furnace 20 to allow for the removal of the carbon nanotubes 140.

Figure 6:
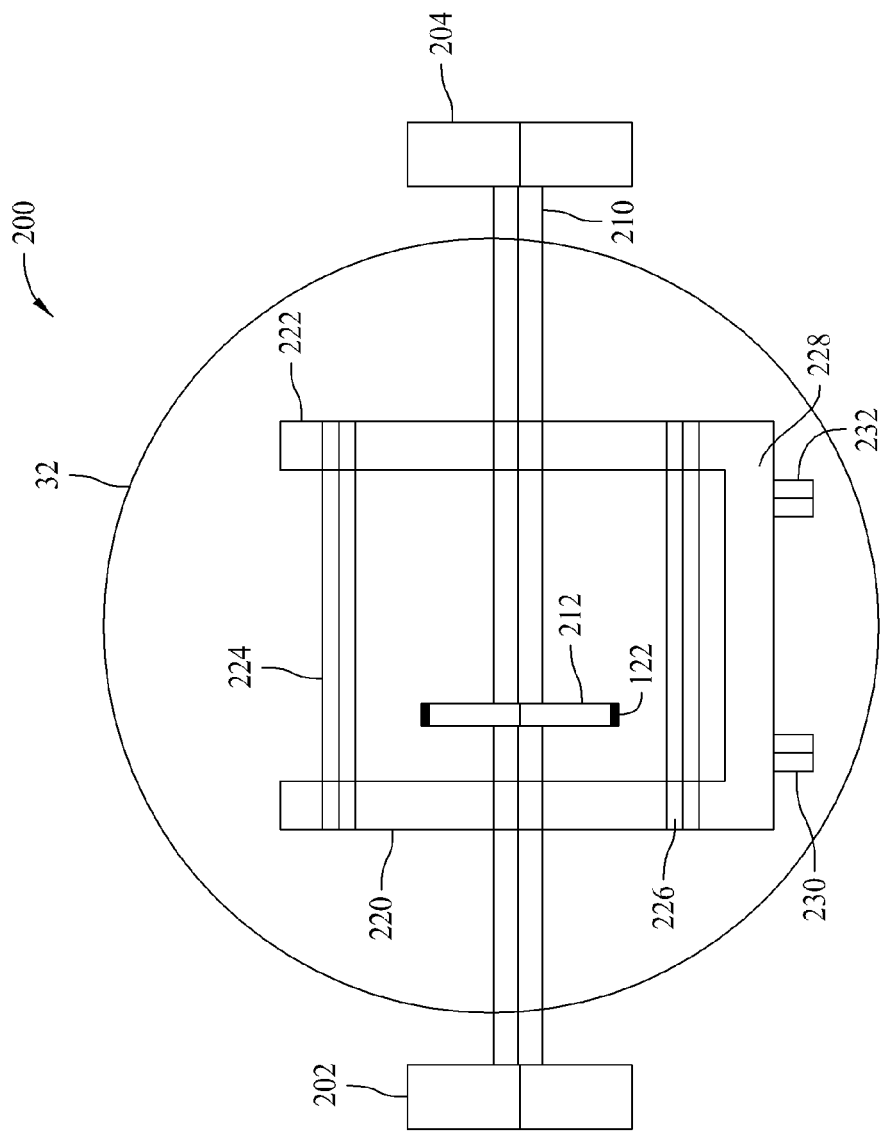
FIG. 6 is an end view of a drive assembly utilized to cause rotation of the spindle.
Figure 7:
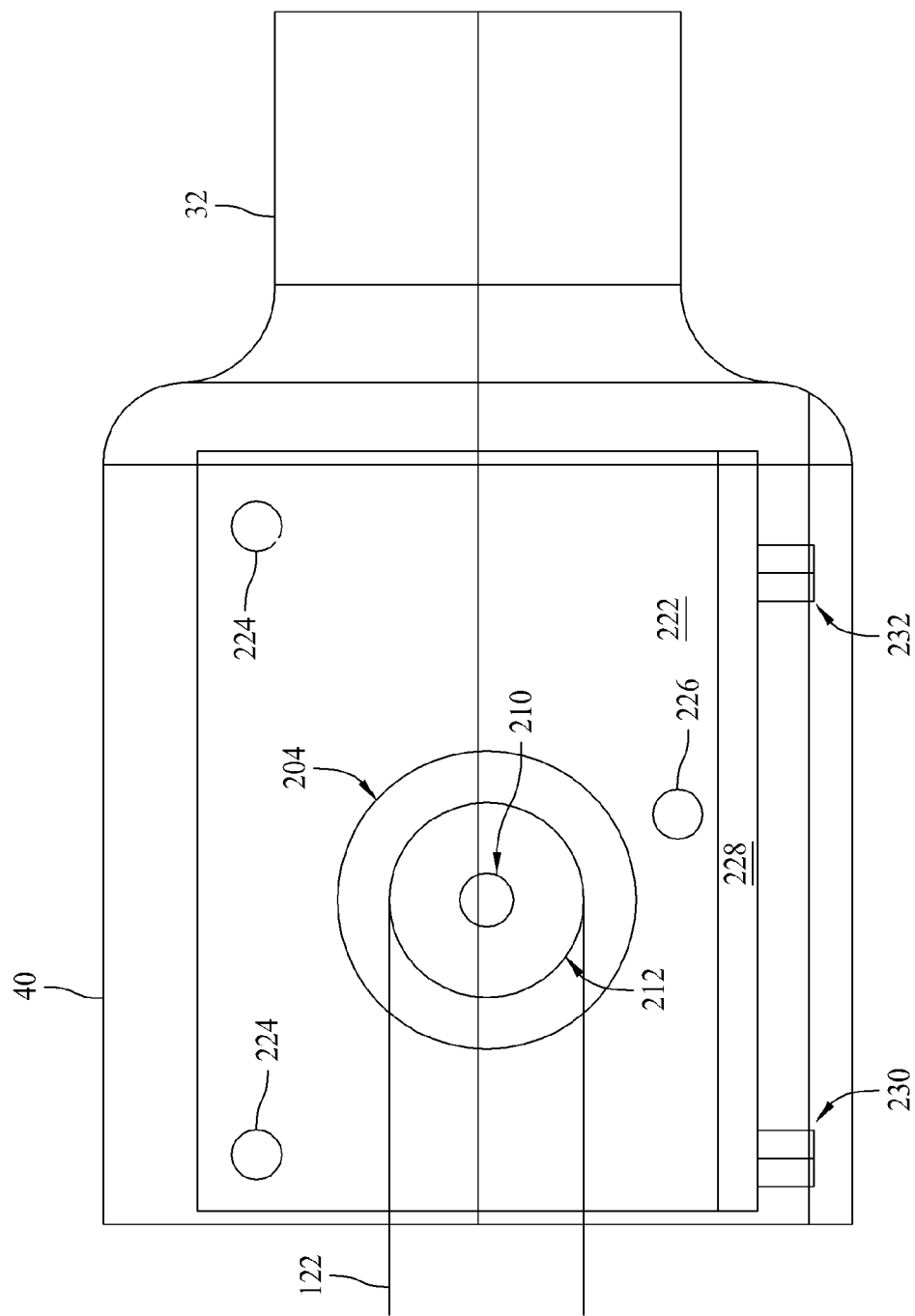
FIG. 7 is a side view of the drive assembly of FIG. 6.

Referring again to the illustrated embodiment, FIG. 6 is an end view of a drive assembly 200, which drives the belt 122 that ultimately causes the spindle 110 to rotate. Drive assembly 200 includes two motors, 202, 204, which in a specific embodiment, are stepper motors. Simply, motor 202 is for turning the driver spindle (and ultimately spindle 110) in a first direction and motor 204 is for turning in the opposite direction. Drive assembly includes a driver spindle 210 that extends between motors 202 and 204. Mounted on driver spindle 210 is a driver sprocket 212. A belt or chain (belt 122) extends between driver sprocket 212 and pulley 121 for imparting a rotation on pulley 121, which is mechanically coupled to spindle 110 as described above. Similar to the bracket assembly of FIG. 5, one or more of brackets 220, 222, spacers 224, 226, a base 228, and stand offs 230, 232 may be used to stabilize the drive assembly 200 base unit. FIG. 7 is a side view of drive assembly 200.

When drive assembly 200 is operating, and spindle 110 is rotating, based on furnace 20 conditions, the nanotubes 140 will grow and the spindle 100 is rotated many times. Eventually, the nanotubes 140 will cover the entire surface 114 of spindle 110 such that any additional length of nanotube 140 will contact only the portion of nanotube 140 that is already on the spindle 110 rather than the spindle surface material itself. Any nanotube length that contacts only other nanotube portions is removable from the spindle 110, where the portion of the nanotubes 140 that contact the surface 114 of spindle 110 may be irreversibly adhered to the spindle 110.

In the implementation described above, an alternative method for removing the nanotubes is to spin the spindle 110 in a direction that is opposite the direction the spindle was rotated during collection of the nanotubes 140, while removing the growth substrate (catalyst 72) through the front of the tube furnace. Specifically, the nanotube length just past the end of the growth substrate can then be attached to another spindle and both spindles can be rotated to transfer the nanotubes out of the furnace. This method utilizes the second stepper motor 204 described above. A third stepper motor may be utilized to drive the axle onto which the completed nanotubes are to be transferred.

In another implementation, the gas is heated before it is allowed into the chemical vapor deposition reactor 10. Such an assembly is insulated to remove the requirement that the assembly be contained within the furnace 20 of reactor 10. In this implementation, the assembly can be opened to place and remove the catalyst laden substrate and spindle. Particularly, the axis of the spindle extends out of the assembly through a hole in the assembly wall and insulation, and the exterior end of the axle is attached directly to a stepper motor. In this implementation the spindle is not limited in size by the two inch or four inch diameter of the typical tube furnace. Thus, beyond the growth substrate, the assembly opens into a chamber containing the spindle. Once the nanotubes make contact with the spindle, the spindle determines the direction of growth, as opposed to the gas flow which originally determines the growth direction. Details of the gas flow within, and through, the chamber is not important with regards to the ability to grow nanotubes to arbitrary length.

In regard to any of the described embodiments, the surface of the spindle is fabricated using a material to which nanotubes will adhere. Particularly, nanotubes adhere well to any surface with roughness features greater than the diameter of the nanotubes themselves. Nanotube diameters are on the order of one to a few nanometers, so almost any surface has significant roughness on the required scale. Therefore, a requirement for spindle surface materials is that the material be stable at the nanotube growth temperature, which may be as high as 800° C. The spindle can be made of copper or steel, or other materials. The spindle surface may be coated in a material that can be later dissolved via a process that will not harm the nanotube, such as in a mild acid bath. The described embodiments allow for the collection of the many turns of nanotube that are in direct contact with the spindle surface or coating.

In any of the described embodiments described herein, the assemblies and components of the assemblies are fabricated from materials that do not conduct a temperature back to the formed nanotubes. If such a situation were to occur, the growth of the nanotubes will cease. For example, the belt 122 described herein cannot cause the spindle to cool as the spindle must be maintained at the temperature at which nanotubes will grow. In addition, the spindle 110 must not pull the nanotubes from the catalyst 72 or let them bunch up by rotating too slowly. The use of the stepper motor, along with any necessary gearing, provides the control necessary to ensure that the spindle rotates at the rate at which the nanotubes grow. Further, the mechanical assemblies also ensure that the spindle cannot move towards (or away from) the catalyst 72.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method to grow carbon nanotubes (CNTs) of arbitrary length within a standard chemical vapor deposition (CVD) furnace, said method comprising:
    positioning a substrate in the furnace, having a catalyst dispersed on the substrate;
    positioning a bracket in the furnace, wherein the bracket includes a first plate and a second plate;
    extending an axle between the first and second plates in a direction that is substantially transverse to a direction of growth of the CNTs;
    mounting a spindle to the axle;
    rotating the spindle within the CNT growth region of the furnace;
    directing the CNTs as they are grown in the direction of the rotating spindle such that the growing CNTs will attach and rotationally collect on the spindle; and
    maintaining a temperature in the region of the spindle at a temperature proximate a CNT growth temperature.

2. The method according to claim 1 further comprising providing a material on a surface of the spindle to which the CNTs will adhere.

3. The method according to claim 1 wherein rotating a spindle within the CNT growth region of the furnace comprises using a drive system to rotate the spindle at a rate that substantially matches a growth rate associated with the CNTs being produced.

4. The method according to claim 3 wherein using a drive system to rotate the spindle comprises:
    mounting a pulley on the axle;
    mechanically coupling the pulley to a drive motor; and
    operating the motor.

5. The method according to claim 3 wherein using a drive system to rotate the spindle comprises:

extending the axle through a wall of the furnace;

mechanically coupling the axle to a drive motor, the drive motor attached to the portion of the axle outside of the furnace; and operating the motor.

6. The method according to claim 1 wherein directing the CNTs as they are grown comprises providing a surface of the spindle at a height such that the surface is encountered by the CNTs after they are directed in the axial direction by the force of a gas flow through the furnace.

7. The method according to claim 1 wherein rotating a spindle within the CNT growth region of the furnace comprises:

using a first motor mechanically coupled to the spindle to rotate the spindle in a first direction for collection of CNTs on the spindle; and using a second motor mechanically coupled to the spindle to rotate the spindle in a second direction, opposite the first direction, for collection of completed CNTs from the spindle.

8. The method according to claim 1 wherein rotating a spindle within the CNT growth region of the furnace comprises translating the spindle back and forth along an axial axis of the spindle such that the CNTs are collected onto the spindle in a spiral configuration.

\* \* \* \* \*